United States Patent
Haikonen et al.

(10) Patent No.: US 10,574,296 B2
(45) Date of Patent: Feb. 25, 2020

(54) METHOD AND APPARATUS FOR EXPANDING FIELD OF NEAR FIELD COMMUNICATION

(75) Inventors: Mikko Haikonen, Espoo (FI); Jan-Erik Ekberg, Vantaa (FI)

(73) Assignee: Nokia Technologies Oy, Espoo (FI)

(*) Notice: Subject to any disclaimer, the term of this patent is extended or adjusted under 35 U.S.C. 154(b) by 0 days.

(21) Appl. No.: 14/423,924

(22) PCT Filed: Aug. 30, 2012

(86) PCT No.: PCT/FI2012/050840
§ 371 (c)(1),
(2), (4) Date: Jun. 7, 2015

(87) PCT Pub. No.: WO2014/033355
PCT Pub. Date: Mar. 6, 2014

(65) Prior Publication Data
US 2015/0365134 A1 Dec. 17, 2015

(51) Int. Cl.
*H04B 5/00* (2006.01)
*G06Q 10/02* (2012.01)
(Continued)

(52) U.S. Cl.
CPC .......... *H04B 5/0031* (2013.01); *G06Q 10/02* (2013.01); *G06Q 20/40* (2013.01); *H04W 12/06* (2013.01);
(Continued)

(58) Field of Classification Search
None
See application file for complete search history.

(56) References Cited

U.S. PATENT DOCUMENTS 6,301,484 B1* 10/2001 Rogers ............... G06F 8/65
455/186.1
2005/0188219 A1 8/2005 Annic et al. ............ 713/200
(Continued)

FOREIGN PATENT DOCUMENTS

CN 1399850 A 2/2003
CN 1921411 A 2/2007
(Continued)

OTHER PUBLICATIONS

NFC Forum, Simple NDEF Exchange Protocol Technical Specification, Aug. 31, 2011, NFCForum-TS-SNEP_1.0, pp. 1-16.*
(Continued)

*Primary Examiner* — Alejandro Rivero
(74) *Attorney, Agent, or Firm* — Harrington & Smith

(57) ABSTRACT

A method, apparatus and computer program are disclosed, which receive information from near field communication for a near field communication application or service, using a protocol stack containing an SNEP layer, SNEP referring to a simple near field communication data exchange format exchange protocol. A short message is received from a mobile telecommunication network. A near field communication extension message is identified in the received short message. The identified near field communication extension message is passed to the near field communication application or service via the SNEP layer in response to the identifying of the near field communication extension message.

16 Claims, 2 Drawing Sheets

(51) Int. Cl.
*G06Q 20/40* (2012.01)
*H04W 12/06* (2009.01)
*H04W 12/08* (2009.01)

(52) U.S. Cl.
CPC ........ *H04W 12/08* (2013.01); *G06Q 2220/00* (2013.01)

(56) References Cited

U.S. PATENT DOCUMENTS

| | | | |
|---|---|---|---|
| 2008/0051122 A1 | 2/2008 | Fisher | |
| 2009/0124273 A1 | 5/2009 | Back | |
| 2010/0222021 A1* | 9/2010 | Balsan | G06Q 20/18 455/406 |
| 2010/0241494 A1* | 9/2010 | Kumar | G06Q 20/204 705/14.1 |
| 2010/0264211 A1* | 10/2010 | Jain | G06F 1/1698 235/380 |
| 2011/0264543 A1 | 10/2011 | Taveau et al. | |
| 2012/0309354 A1* | 12/2012 | Du | H04W 12/12 455/411 |
| 2013/0059534 A1* | 3/2013 | Sobalvarro | G06Q 30/02 455/41.1 |
| 2013/0080276 A1* | 3/2013 | Granbery | G06Q 20/20 705/21 |

FOREIGN PATENT DOCUMENTS

| | | |
|---|---|---|
| CN | 102611483 A | 7/2012 |
| EP | 1898592 A1 | 3/2008 |
| WO | 2008042302 | 4/2008 |
| WO | 2010094014 | 8/2010 |

OTHER PUBLICATIONS

NFC Forum, NFC Data Exchange Format (NDEF) Technical Specification, Jul. 24, 2006, NFCForum-TS-NDEF_1.0, pp. 1-21.*
"NFC Data Exchange Format", Technical Specification, NDEF 1.0, NFC Forum, Jul. 24, 2006, 69 Pages.
"Simple NDEF Exchange Protocol", Technical Specification, SNEP 1.0, NFC Forum, Aug. 31, 2011, 20 Pages.
"3rd Generation Partnership Project; Technical Specification Group Terminals; Technical realization of the Short Message Service (SMS); (Release 2000)", 3GPP TS 23.040, V4.0.0, Jul. 2000, pp. 1-126.
Extended European Search Report received for corresponding European Patent Application No. 12883990.9, dated Apr. 6, 2016, 4 pages.
International Search Report and Written Opinion received for corresponding Patent Cooperation Treaty Application No. PCT/FI2012/050840, dated Jun. 4, 2013, 14 pages.

* cited by examiner

METHOD AND APPARATUS FOR EXPANDING FIELD OF NEAR FIELD COMMUNICATION

RELATED APPLICATION

This application was originally filed as PCT Application No. PCT/FI2012/050840 filed Aug. 30, 2012.

TECHNICAL FIELD

The present application generally relates to a method and apparatus for expanding field of near field communication.

BACKGROUND

A host of other communication technologies have been developed by the mankind, starting from smoke signals and wireless telegraphs to satellite radios. Development has typically extended the range of communications and increased the quality and speed of communications. Sometimes, speed and power efficiency have been prioritized over range and new, shorter range techniques have been designed for more local communications. Bluetooth, wireless local area network and near field communication are such techniques, with near field communication being intended for short ranges. For instance, bus tickets can be ready by touching or placing a near field communication enabled ticket near a reader device.

The increase of alternatives has increased choice and helped to solve many technical problems but also brought about all new questions and problems to solve.

SUMMARY

Various aspects of examples of the invention are set out in the claims.

According to a first example aspect of the present invention, there is provided an apparatus comprising:
- a mobile telephone receiver configured to receive a short message;
- a near field communication unit configured to receive information from near field communication for a near field communication application or service, the near field communication unit comprising a protocol stack containing an SNEP layer, wherein SNEP refers to a simple near field communication data exchange format exchange protocol;
- at least one processor configured to:
  - identify a near field communication extension message in the received short message; and
  - to pass the identified near field communication extension message to the near field communication application or service via the SNEP layer of the near field communication unit in response to the identifying of the near field communication extension message.

The SNEP layer may be compliant with Simple NDEF Exchange, Protocol Technical Specification, NFC Forum™, SNEP 1.0, NFCForum-TS-SNEP_1.0, 2011-08-31.

The near field communication data exchange format may be compliant with NFC Data Exchange Format (NDEF), Technical Specification, NFC Forum™, NDEF 1.0, NFC-Forum-TS-NDEF_1.0, 2006-07-24.

The mobile telephone may be compliant with one or more of the following: Global System for Mobile Communications, Universal Mobile Telecommunications System (UMTS), Personal Digital Cellular (PDC), CDMA2000 or IS-2000, Interim Standard 95 (IS-95), and satellite phone service.

The short message may refer to a message of a short message service that is compliant with 3GPP TS 23.040 4.0.0 with support for enhanced messaging service.

The at least one processor may be configured to identify the near field communication extension message from the presence of a respective identifier in the received short message.

The at least one processor may further be configured to prompt a user for confirmation before performing the passing of the near field communication extension message.

The near field communication extension message may be cryptographically secured.

The extension message may comprise a warranty extension for the apparatus.

The extension message may comprise a ticket record configured to provide a cryptographically secured ticket for the apparatus.

The extension message may comprise a payment record configured to provide a cryptographically secured payment authorization for the apparatus.

The processor may be configured to cryptographically process received extension messages received independently of whether received by the near field communication unit or by the mobile telephone receiver.

The extension message may be cryptographically secured by a one-way hashing operation based on a password that is specific to the apparatus.

The extension message may be cryptographically secured by a one-way hashing operation based on a password that is specific to the model of the apparatus.

The extension message may be cryptographically secured using an International Mobile Equipment Identity (IMEI) of the apparatus.

The near field communication application or service may comprise a warranty management application.

According to a second example aspect of the present invention there is provided a method comprising:
- receiving information from near field communication for a near field communication application or service, using a protocol stack containing an SNEP layer, wherein SNEP refers to a simple near field communication data exchange format exchange protocol;
- receiving a short message from a mobile telecommunication network;
- identifying a near field communication extension message in the received short message; and
- passing the identified near field communication extension message to the near field communication application or service via the SNEP layer in response to the identifying of the near field communication extension message.

According to a third example aspect of the present invention, there is provided a computer program comprising:
- code for receiving information from near field communication for a near field communication application or service, using a protocol stack containing an SNEP layer, wherein SNEP refers to a simple near field communication data exchange format exchange protocol;
- code for identifying a near field communication extension message in the received short message; and
- code for passing the identified near field communication extension message to the near field communication application or service via the SNEP layer in response to the identifying of the near field communication extension message, when the computer program is run on a processor.

According to a fourth example aspect of the present invention, there is provided a non-transitory computer-readable medium comprising the computer program of the third example aspect.

According to a fifth example aspect of the present invention, there is provided an apparatus comprising:
  means for receiving information from near field communication for a near field communication application or service, using a protocol stack containing an SNEP layer, wherein SNEP refers to a simple near field communication data exchange format exchange protocol;
  means for receiving a short message from a mobile telecommunication network;
  means for identifying a near field communication extension message in the received short message; and
  means for passing the identified near field communication extension message to the near field communication application or service via the SNEP layer in response to the identifying of the near field communication extension message.

Any foregoing memory medium may comprise a digital data storage such as a data disc or diskette, optical storage, magnetic storage, holographic storage, opto-magnetic storage, phase-change memory, resistive random access memory, magnetic random access memory, solid-electrolyte memory, ferroelectric random access memory, organic memory or polymer memory. The memory medium may be formed into a device without other substantial functions than storing memory or it may be formed as part of a device with other functions, including but not limited to a memory of a computer, a chip set, and a sub assembly of an electronic device.

Different non-binding example aspects and embodiments of the present invention have been illustrated in the foregoing. The embodiments in the foregoing are used merely to explain selected aspects or steps that may be utilized in implementations of the present invention. Some embodiments may be presented only with reference to certain example aspects of the invention. It should be appreciated that corresponding embodiments may apply to other example aspects as well.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

Figure 1:
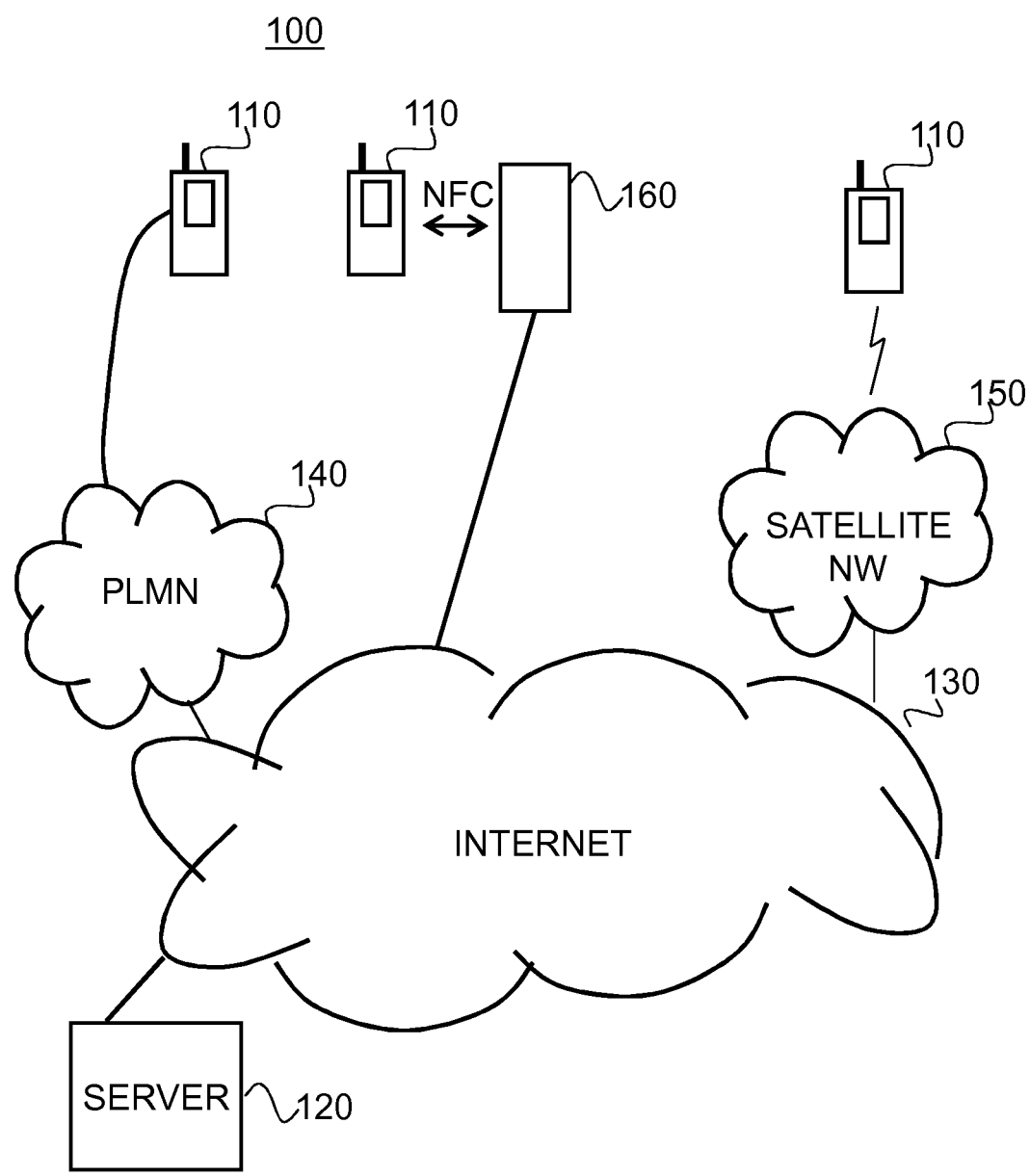
FIG. 1 shows an architectural overview of a system of an example embodiment of the invention.
Figure 2:
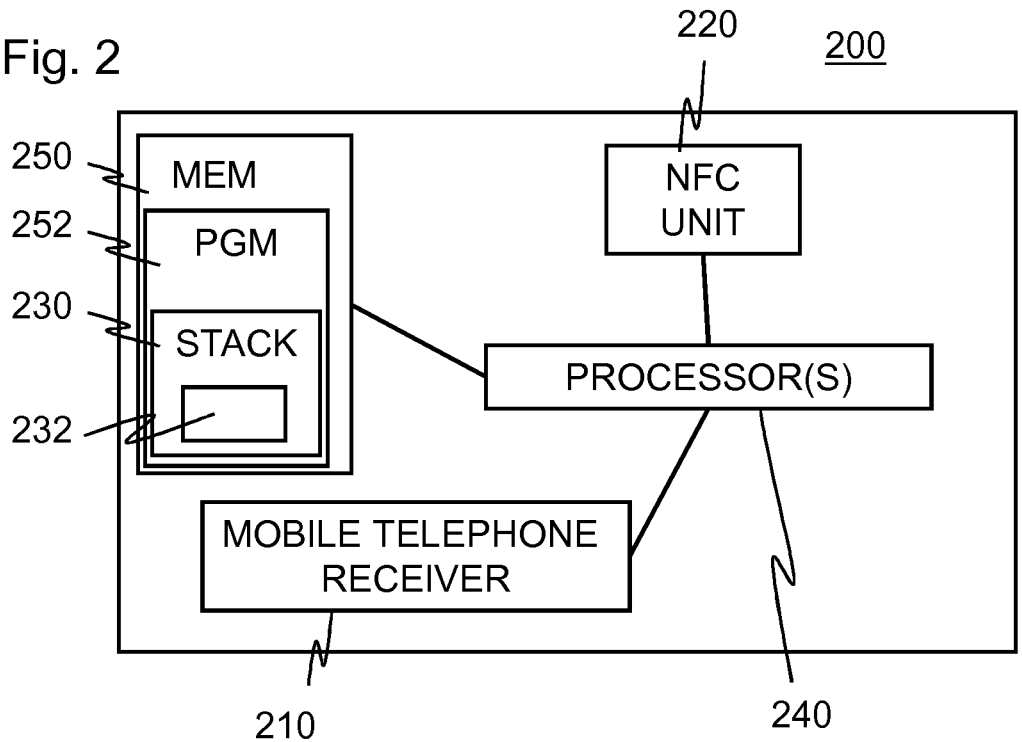
FIG. 2 shows a simplified block diagram of an apparatus of an example embodiment of the invention.
Figure 3:
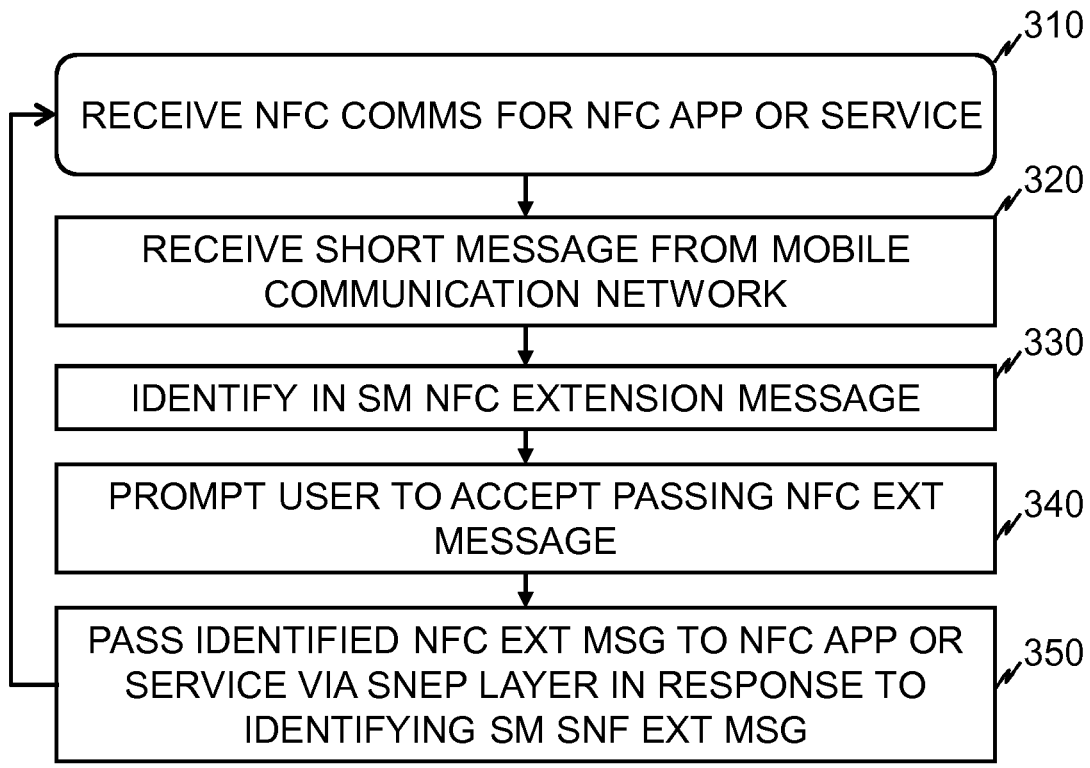
FIG. 3 shows a flow diagram of an example embodiment of the invention.

An example embodiment of the present invention and its potential advantages are understood by referring to FIGS. 1 through 3 of the drawings.

FIG. 1 shows an architectural overview of a system 100 of an example embodiment of the invention. The system 100 comprises a plurality of communication terminals 110 and a server 120 that provides either by online or offline communication information to the communication terminals 110. The server 120 is connected in this example embodiment to Internet 130. Connected to the internet, FIG. 1 shows a public land mobile network 140 and a satellite network 150 as well as a fixed near field communication station 160. The fixed near field communication station 160 is, for example, a public transport ticket reader or a reader at a till of a shop.

The communication terminals 110 need not be identical or of common type. Some of the communication terminals 110 can be configured, for example, to use one cellular telephone standard while some others can be configured for use as satellite phones or as multi-standard devices compliant with more than one different communication standards. It is assumed in the following merely in sake of simplicity that the communication terminals are similar and capable of both near field communications and of cellular communications using universal mobile telecommunications system.

The server 120 can be an entity formed of one or more units, either co-located or distributed. In some embodiments, the server 120 or some parts thereof are formed in one or more of the communication terminals 110.

FIG. 2 shows a simplified block diagram of an apparatus 200 of an example embodiment of the invention. The apparatus can be used as the communication terminal 110. The apparatus 200 comprises:
  a mobile telephone receiver 210 configured to receive a short message;
  a near field communication unit 220 configured to receive information from near field communication for a near field communication application or service, the near field communication unit 220 comprising a protocol stack 230 containing an SNEP layer 232, wherein SNEP refers to a simple near field communication data exchange format exchange protocol;
  at least one processor 240 configured to:
    identify a near field communication extension message in the received short message; and
    to pass the identified near field communication extension message to the near field communication application or service via the SNEP layer 232 of the near field communication unit.

The apparatus 200 also comprises a memory 250 configured to store computer program code 252 for controlling the operation of the at least one processor 240. The memory 250 can also store received short messages. The computer program code is configured, in one example embodiment, to define the protocol stack 230. The protocol stack comprises the SNEP layer 232 on a Logical Link Control Protocol (LLCP) that is on a radio interface layer such as near field communication interface and protocol-2 (NFCIP-2).

In an example embodiment, the SNEP layer 232 is compliant with Simple NDEF Exchange, Protocol Technical Specification, NFC Forum™, SNEP 1.0, NFCForum-TS-SNEP_1.0, 2011-08-31.

In an example embodiment, the near field communication data exchange format is compliant with NFC Data Exchange Format (NDEF), Technical Specification, NFC Forum™, NDEF 1.0, NFCForum-TS-NDEF_1.0, 2006-07-24.

In an example embodiment, the mobile telephone receiver 210 is compliant with one or more of the following: Global System for Mobile Communications, Universal Mobile Telecommunications System (UMTS), Personal Digital Cellular (PDC), CDMA2000 or IS-2000, Interim Standard 95 (IS-95), and satellite phone service.

In an example embodiment, the short message refers to a message of a short message service that is compliant with 3GPP TS 23.040 4.0.0 with support for enhanced messaging service.

In an example embodiment, the at least one processor 240 is configured to identify the near field communication extension message from the presence of a respective identifier in the received short message.

In an example embodiment, the at least one processor 240 is further configured to prompt a user for confirmation before performing the passing of the near field communication extension message.

In an example embodiment, the near field communication extension message is cryptographically secured.

In an example embodiment, the extension record comprises a warranty extension for the apparatus 200.

In an example embodiment, the extension record comprises a ticket record configured to provide a cryptographically secured ticket for the apparatus 200.

In an example embodiment, the extension record comprises a payment record configured to provide a cryptographically secured payment authorization for the apparatus 200.

In an example embodiment, the at least one processor 240 is configured to cryptographically process received extension records received independently of whether received by the near field communication unit 220 or by the mobile telephone receiver 210.

In an example embodiment, the extension message is cryptographically secured by a one-way hashing operation based on a password that is specific to the apparatus 200.

In an example embodiment, the extension message is cryptographically secured by a one-way hashing operation based on a password that is specific to the model of the apparatus 200.

In an example embodiment, the extension message is cryptographically secured using an International Mobile Equipment Identity (IMEI) of the apparatus 200.

In an example embodiment, the near field communication application or service comprises a warranty management application.

FIG. 3 shows a flow diagram of an example embodiment of the invention. One or more near field communications are received 310 by the apparatus 200 using its near field communication unit 220, for an application or service run by the apparatus 200. Steps 320 to 340 illustrate receiving of near field communications using a short message extension. The apparatus 200 receives 320 a short message and identifies 330 in the short message a near field communication extension message. The near field communication extension message is carried, for instance, by a data field of the short message and identified by a header configured to indicate the type of the short message as a near field communication extension message. The apparatus 200 then responsively passes 350 the identified near field communication extension message to the near field communication application or service via the SNEP layer. In an example embodiment, the near field communication extension message also carries an identifier of a target application or service for indicating to the apparatus 200 the application or service to which the near field communication extension message should be passed. In an alternative example embodiment, the apparatus 200 deduces the destination of the near field extension message based on the content of the near field communication extension message. In yet another example embodiment, the apparatus 200 prompts 340 the user for a permission to pass the near field communication extension message and performs the passing only if accepted by the user of the apparatus 200. In one example embodiment, the apparatus 200 prompts the user for the destination of the near field communication extension message. This prompting can also implicitly or explicitly input the user acceptance for the passing of the near field communication extension message.

Without in any way limiting the scope, interpretation, or application of the claims appearing below, a technical effect of one or more of the example embodiments disclosed herein is near field communication applications or services can be provided data from other devices over a range that is extended by using a short message service. Another technical effect of one or more of the example embodiments disclosed herein is that by subjecting to user confirmation passing of data to a near field communication application or service, abuse of extended near field communications can be restrained. Another technical effect of one or more of the example embodiments disclosed herein is that automated warranty extension and ticket or authorization delivery can be extended.

Embodiments of the present invention can be implemented in software, hardware, application logic or a combination of software, hardware and application logic. The software, application logic and/or hardware may reside, for instance, on the at least one processor 240 or memory 250. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 2 as the apparatus 200. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the before-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the foregoing describes example embodiments of the invention, these descriptions should not be viewed in a limiting sense. Rather, there are several variations and modifications which may be made without departing from the scope of the present invention as defined in the appended claims.

What is claimed is:

1. An apparatus comprising:
    a mobile telephone receiver for receiving a short message service message over a mobile communication network;
    a near field communication unit for receiving a near field communication for a target near field communication application or service, the near field communication unit including a protocol stack containing an SNEP (simple near field communication data exchange format exchange protocol) layer;
    at least one processor; and at least one memory, said at least one memory including computer program code, the at least one memory and the computer program code being configured, with the at least one processor, to enable the apparatus to:

receive a short message service message over the mobile communication network, wherein the short message service message includes a near field communication as a near field communication extension message, said near field communication extension message being carried in a data field of the short message service message, being identified by a near field communication extension message identifier as a near field communication extension message, and including a target application identifier for the target near field communication application or service;

identify the near field communication extension message in the short message service message from the presence of the near field communication extension message identifier in the short message service message; and pass the near field communication extension message to the target near field communication application or service through the SNEP layer of the near field communication unit, whereby the target near field communication application or service is provided with data over a range extended by using a short message service.

2. The apparatus of claim 1, wherein the at least one memory is further configured to store the received short message service message.

3. The apparatus of claim 1, wherein the at least one memory and the computer program code are further configured, with the at least one processor, to enable the apparatus to:

prompt a user for confirmation before passing the near field communication extension message to the target near field communication application or service via the SNEP layer.

4. The apparatus of claim 1, wherein the near field communication extension message is cryptographically secured.

5. The apparatus of claim 1, wherein the near field communication extension message includes a warranty extension for the apparatus.

6. The apparatus of claim 1, wherein the near field communication extension message includes a ticket record providing a cryptographically secured ticket for the apparatus.

7. The apparatus of claim 1, wherein the near field communication extension message includes a payment record providing a cryptographically secured payment authorization for the apparatus.

8. The apparatus of claim 1, wherein the near field communication extension message is cryptographically secured by a one-way hashing operation based on a password specific to the apparatus or to the model of the apparatus.

9. A method comprising:

receiving a short message service message over a mobile telecommunication network, wherein the short message service message includes a near field communication as a near field communication extension message, said near field communication extension message being carried in a data field of the short message service message, being identified by a near field communication extension message identifier as a near field communication extension message, and including a target application identifier for a target near field communication application or service;

identifying the near field communication extension message in the short message service message from the presence of the near field communication extension message identifier in the short message service message; and passing the near field communication extension message to the target near field communication application or service through an SNEP (simple near field communication data exchange format exchange protocol) layer of a protocol stack of a near field communication unit, whereby the target near field communication application or service is provided with data over a range extended by using a short message service.

10. The method of claim 9, further comprising:

prompting a user for confirmation before passing the near field communication extension message to the target near field communication application or service via the SNEP layer.

11. The method of claim 9, wherein the near field communication extension message is cryptographically secured.

12. The method of claim 9, wherein the near field communication extension message includes a warranty extension for an apparatus.

13. The method of claim 9, wherein the near field communication extension message includes a ticket record providing a cryptographically secured ticket for an apparatus.

14. The method of claim 9, wherein the near field communication extension message includes a payment record providing a cryptographically secured payment authorization for an apparatus.

15. The method of claim 9, further comprising:

cryptographically processing said near field communication extension message.

16. A computer program product comprising a non-transitory computer-readable storage medium bearing computer program code embodied therein for use with a computer, the computer program code comprising code for performing:

receiving a short message service message over a mobile telecommunication network, wherein the short message service message includes a near filed communication as a near field communication extension message, said near field communication extension message being carried in a data field of the short message service message, being identified by a near field communication extension message identifier as a near field communication extension message, and including a target application identifier for a target near field communication application or service;

identifying the near field communication extension message in the short message service message from the presence of the near field communication extension message identifier in the short message service message; and passing the near field communication extension message to the target near field communication application or service through an SNEP (simple near field communication data exchange format exchange protocol) layer of a protocol stack of a near field communication unit, whereby the target near field communication application or service is provided with data over a range extended by using a short message service.

* * * * *